United States Patent
Nishimura et al.

(10) Patent No.: US 11,014,511 B2
(45) Date of Patent: May 25, 2021

(54) WIRING MEMBER INCLUDING A SHAPE MAINTAINING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Shigeki Ikeda, Mie (JP); Daisuke Ebata, Mie (JP); Ryuta Takakura, Mie (JP); Haruka Nakano, Mie (JP); Kenta Arai, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/605,339

(22) PCT Filed: Oct. 23, 2018

(86) PCT No.: PCT/JP2018/039282
§ 371 (c)(1),
(2) Date: Oct. 15, 2019

(87) PCT Pub. No.: WO2019/225030
PCT Pub. Date: Nov. 28, 2019

(65) Prior Publication Data
US 2021/0024020 A1    Jan. 28, 2021

(30) Foreign Application Priority Data
May 25, 2018    (JP) .............................. JP2018-100640

(51) Int. Cl.
*H02G 3/30*    (2006.01)
*B60R 16/02*   (2006.01)

(52) U.S. Cl.
CPC .......... *B60R 16/0215* (2013.01); *H02G 3/30* (2013.01)

(58) Field of Classification Search
CPC ............................. B60R 16/0215; H02G 3/30
(Continued)

(56) References Cited

U.S. PATENT DOCUMENTS

| | | | | |
|---|---|---|---|---|
| 4,192,965 A | * | 3/1980 | Baum ...................... | H02G 3/10 174/135 |
| 4,406,916 A | * | 9/1983 | Southerland ............. | H02G 3/26 174/135 |

(Continued)

FOREIGN PATENT DOCUMENTS

| | | |
|---|---|---|
| CN | 103003858 A | 3/2013 |
| JP | 2005-312177 | 11/2005 |

(Continued)

OTHER PUBLICATIONS

Chinese Office Action, Chinese Patent Office, Application No. 201880028395.2, dated Jun. 19, 2020, with English translation thereof.

(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

The wiring member includes a flat wiring member and a shape maintaining member. The flat wiring member includes a plurality of wire-like transmission members (for example, insulated wires) and a base member (for example, a sheet member) keeping the plurality of wire-like transmission (Continued)

members in a flat state. The shape maintaining member is provided in at least a part of the flat wiring member to keep at least the part of the flat wiring member in an uneven shape.

5 Claims, 5 Drawing Sheets

(58) Field of Classification Search
USPC .................................................. 174/72 TR
See application file for complete search history.

(56) References Cited

U.S. PATENT DOCUMENTS

| | | | | |
|---|---|---|---|---|
| 5,736,673 | A * | 4/1998 | Lee ........................ | H02G 3/26 |
| | | | | 174/135 |
| 6,667,441 | B2 * | 12/2003 | Steinhauer ............ | B60R 16/027 |
| | | | | 174/117 F |
| 7,587,795 | B2 * | 9/2009 | Yamamoto .......... | B60R 16/0215 |
| | | | | 174/117 F |
| 2002/0092666 | A1 * | 7/2002 | Hasegawa .............. | H01R 12/69 |
| | | | | 174/92 |
| 2012/0267145 | A1 * | 10/2012 | Huang .................. | H01B 7/0861 |
| | | | | 174/117 F |
| 2013/0070430 | A1 | 3/2013 | Hirota et al. | |

FOREIGN PATENT DOCUMENTS

| | | | |
|---|---|---|---|
| JP | 2008-060045 | A | 3/2008 |
| JP | 2010-212223 | A | 9/2010 |
| JP | 2014-11910 | | 1/2014 |
| JP | 5464985 | B | 1/2014 |
| JP | 2014-143861 | | 8/2014 |
| JP | 2017-63573 | | 3/2017 |
| JP | 2017063573 | * | 3/2017 |

OTHER PUBLICATIONS

U.S. Appl. No. 16/605,638 to Housei Mizuno et al., filed Oct. 16, 2019.
U.S. Appl. No. 16/607,496 to Housei Mizuno et al., filed Oct. 23, 2019.
U.S. Appl. No. 16/619,730 to Haruka Nakano et al., filed Dec. 5, 2019.
Official Communication issued in International Bureau of WIPO Patent Application No. PCT/JP2018/039282, dated Dec. 4, 2018, (along with an English translation thereof).
International Preliminary Report on Patentability, WIPO, Application No. PCT/JP2018/039282, dated Dec. 1, 2020, with English translation.
India Office Action, India Patent Office, Application No. 201917044156, dated Oct. 28, 2020.

* cited by examiner

WIRING MEMBER INCLUDING A SHAPE MAINTAINING MEMBER

TECHNICAL FIELD

The present invention relates to a wiring member connecting components mounted to a vehicle to each other.

BACKGROUND ART

Patent Document 1 discloses a flexible flat cable which includes a sheet-like insulator having flexibility and a flat conductor formed in the insulator, wherein a first end and a second end on an opposite side of the first end are connected to two in-vehicle electronic units, respectively. The flat cable is made up of two thin insulating films sandwiching a plurality of conductors, which are parallelly disposed, from both sides, for example.

PRIOR ART DOCUMENTS

Patent Documents

Patent Document 1: Japanese Patent Application Laid-Open No. 2014-11910

SUMMARY

Problem to be Solved by the Invention

However, if the flat cable is arranged along an uneven surface to which the flat cable is to be attached, the flat cable may significantly separate from the uneven surface having a difference in height.

An object of the present invention is to provide a technique capable of arranging a flat wiring member as close as possible to an uneven surface to which the flat wiring member is to be attached at a time of arranging the wiring member on the uneven surface.

Means to Solve the Problem

In order to solve the above problem, a wiring member according to a first aspect includes: a flat wiring member including a plurality of wire-like transmission members and a base member keeping the plurality of wire-like transmission members in a flat state; and a shape maintaining member provided in at least a part of the flat wiring member to keep at least the part of the flat wiring member in an uneven shape.

The wiring member according to a second aspect is the wiring member according to the first aspect, wherein a fixing hole is formed in the base member, a fixing protrusion insertable into the fixing hole is formed on the shape maintaining member, and the flat wiring member is positioned with respect to the shape maintaining member with the fixing protrusion being inserted into the fixing hole.

The wiring member according to a third aspect is wiring member according to the first or second aspect that the flat wiring member includes a sheet member as the base member, and the plurality of wire-like transmission members are arranged on one main surface of the sheet member.

The wiring member according to a fourth aspect is the wiring member according to the third aspect, wherein the shape maintaining member is provided for the plurality of wire-like transmission members on a side identical with a side on which the sheet member is provided.

The wiring member according to a fifth aspect is the wiring member according to the third or fourth aspect, wherein the shape maintaining member is provided on a an outer surface side of the sheet member.

The wiring member according to a sixth aspect is the wiring member according to the third or fourth aspect, wherein the sheet member includes a first sheet member holding a part of the plurality of wire-like transmission members in an extension direction in a flat state and a second sheet member holding another part of the plurality of wire-like transmission members in an extension direction in a flat state in a position separated from the first sheet member, and the shape maintaining member is provided between the first sheet member and the second sheet member.

Effects of the Invention

According to the first aspect, an uneven shape corresponding to a shape of an uneven surface of an object-attached part can be kept in the flat wiring member by the shape maintaining member. Thus, the wiring member can be arranged as close as possible to the uneven surface of the object-attached part at a time of arranging the wiring member on the uneven surface.

According to the second aspect, the flat wiring member can be easily positioned with respect to the shape maintaining member.

According to the third aspect, the plurality of wire-like transmission members kept in the flat state by the sheet member can be arranged as close as possible to the uneven surface of the object-attached part.

According to the fourth embodiment, the same side as the side on which the sheet member is provided in the plurality of wire-like transmission members can be protected by the shape maintaining member.

According to the fifth embodiment, the plurality of wire-like transmission members kept in the flat state by the sheet member can be kept in a predetermined uneven shape by the shape maintaining member from an outer surface side of the sheet member.

According to the sixth aspect, the sheet member can be reduced between the first sheet member and the second sheet member. The plurality of wire-like transmission members can be protected by the shape maintaining member between the first sheet member and the second sheet member.

DESCRIPTION OF EMBODIMENT(S)

First Embodiment

Figure 1:
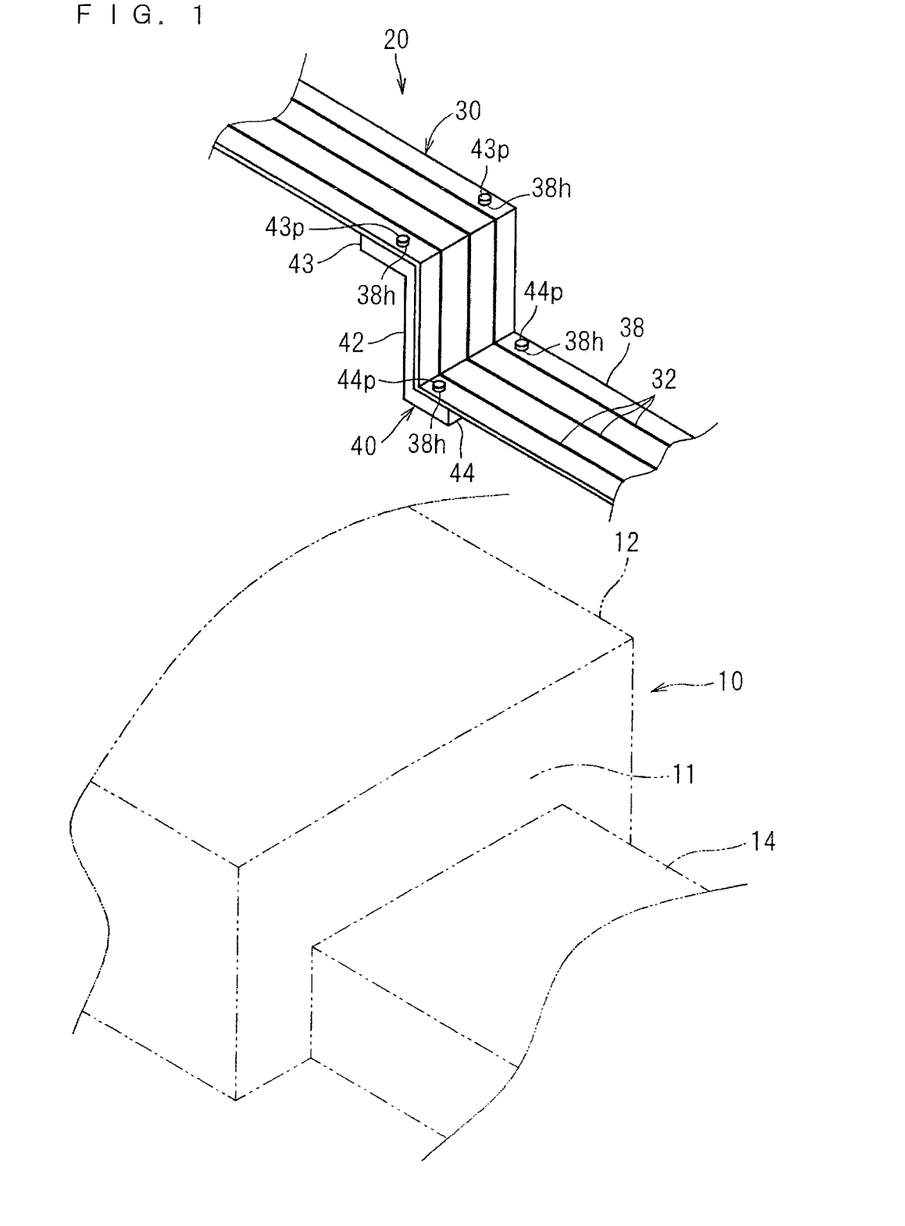
FIG. 1 A schematic perspective view illustrating a wiring member according to a first embodiment.
Figure 2:
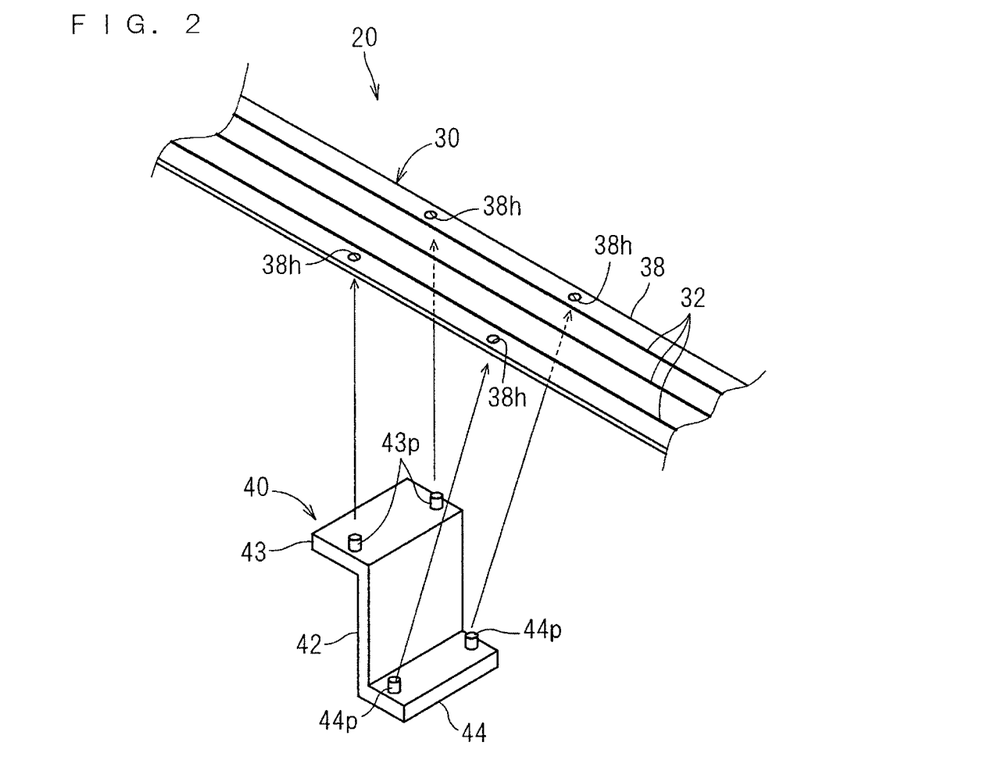
FIG. 2 A schematic exploded perspective view illustrating the wiring member in FIG. 1.

A wiring member according to a first embodiment is described hereinafter. FIG. 1 is a schematic perspective view illustrating a wiring member 20, and FIG. 2 is a schematic exploded perspective view illustrating the wiring member 20.

The wiring member 20 is a member connecting components mounted to a vehicle. The wiring member 20 includes a flat wiring member 30 and a shape maintaining member 40.

The flat wiring member 30 includes a plurality of (three in FIG. 1) wire-like transmission members 32 and a base member 38.

The wire-like transmission member 32 is a wire-like member transmitting electricity or light, for example. Described herein as an example is that the wire-like transmission member 32 is an insulated wire 32 including a core wire and an insulating covering for covering the core wire. The core wire is made up of one or a plurality of wires. The wire is formed of a conductor made of copper, copper alloy, aluminum, or aluminum alloy, for example. The insulating covering is formed of a resin material such as polyvinyl chloride (PVC) or polyethylene (PE) extrusion-molded around the core wire.

The base member 38 is a member keeping the plurality of insulated wires 32 in a flat state.

An example of the base member 38 being the sheet member 38 is described herein. A material constituting the sheet member 38 is not particularly limited, however, the sheet member 38 is preferably formed of a material containing a resin of polyvinyl chloride (PVC), polyethylene terephthalate (PET), or polypropylene (PP). The sheet member 38 may be a sheet member with an inner portion evenly filled or a non-woven sheet, for example. The sheet member 38 may contain a material such as a metal, for example. The sheet member 38 preferably has flexibility of easily bending in a thickness direction. The sheet member 38 may be a single layer or may be a plurality of stacked layers. When the sheet member 38 is the plurality of stacked layers, it is considered that a resin layer and a resin layer are stacked, for example. It is also considered that a resin layer and a metal layer are stacked, for example.

In the example illustrated in FIG. 1 and FIG. 2, the sheet member 38 is formed to have an elongated shape, however, the shape of the sheet member 38 is not limited thereto. The sheet member 38 may be formed to have a shape of being bent in accordance with an arrangement route of the insulated wire 32, for example.

The plurality of insulated wires 32 are arranged on one main surface of the sheet member 38.

A configuration of holding the plurality of insulated wires 32 on the main surface of the sheet member 38 is not particularly limited.

For example, a configuration of melting and joining the insulated wire 32 and the sheet member 38 can be adopted as a configuration of joining them. That is to say, at least one of the insulated wire 32 and the sheet member 38 has a resin material, and the resin material is melt to be joined to the other element. Herein, the insulating covering and the resin sheet member are melted together and mutually joined. In this case, the insulating covering and the resin sheet member preferably contain the same resin material.

Figure 3:
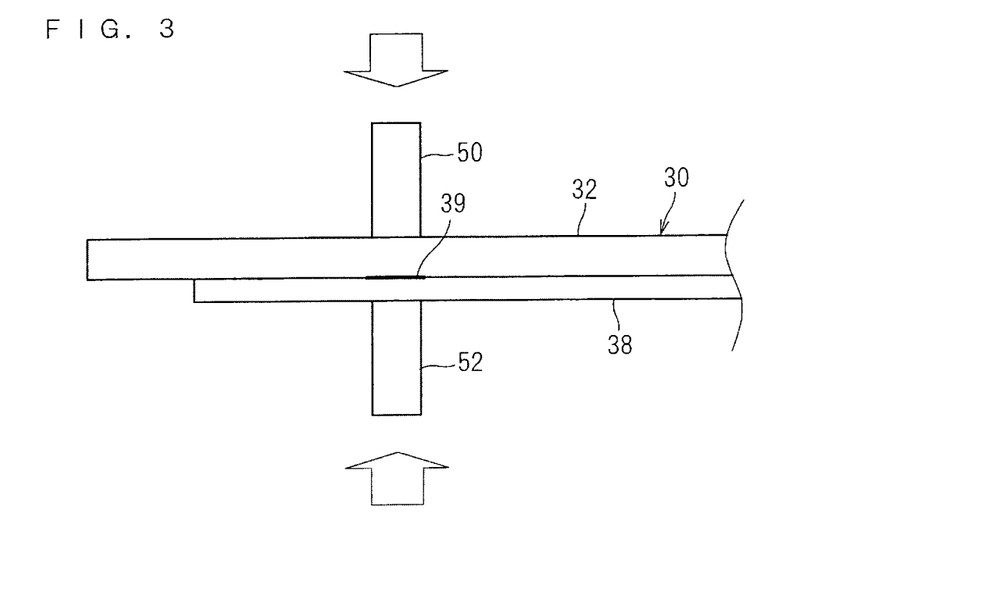
FIG. 3 An explanation drawing illustrating an electric insulated wire sewn to a sheet member with a sewing thread.

Specifically, as illustrated in FIG. 3, for example, it is also applicable to sandwich the insulated wire 32 and the sheet member 38 between a chip 50 and an anvil 52 for ultrasonic joining to ultrasonic-weld the insulated wire 32 to the sheet member 38. In this case, the insulated wire 32 and the sheet member 38 are joined with a joint part 39, which is made up of at least one of the insulated wire 32 and the sheet member 38 which has been melted, therebetween.

The insulated wire 32 and the sheet member 38 can be melted and joining by various melting and jointing methods such as heating and pressurizing welding, hot-air welding, and high-frequency welding besides the ultrasonic welding described above.

A resin of at least the wire and the sheet member may be melted or dissolved by heat or a solvent, and joined. A known joining configuration such as melting and joining, fusion, and welding can be adopted as the joining configuration.

The insulated wire 32 and the sheet member 38 may be joined by an adhesive agent or a double-sided tape, for example.

Figure 4:
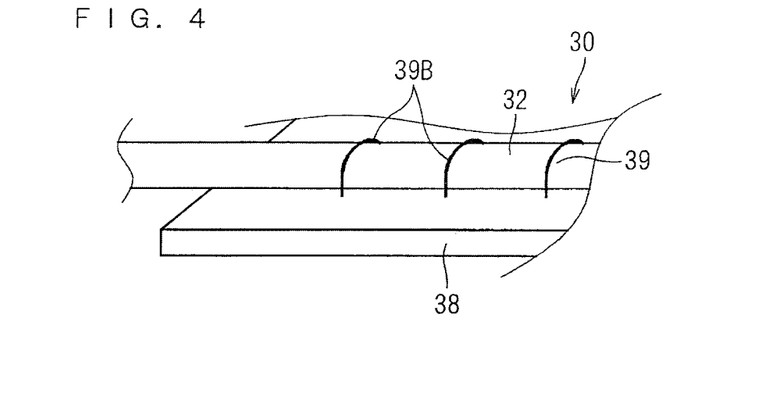
FIG. 4 An explanation drawing illustrating the wiring member arranged along an uneven surface.

As illustrated in FIG. 4, the insulated wire 32 may be sewn and joined to the sheet member 38 with a sewing thread 39B.

The plurality of insulated wires 32 are held in parallel by the sheet member 38. It is not necessary that the plurality of insulated wires 32 are held in parallel, but the plurality of insulated wires may be halfway bent or branched.

A fixing hole 38h is formed in the sheet member 38. The fixing hole 38h passes through the sheet member 38 in a thickness direction of the sheet member 38, and fixing protrusions 43p and 44p described later are inserted into the fixing holes 38h.

Herein, the shape maintaining member 40 is attached to a middle part of the flat wiring member 30 in an extension direction. The pair of fixing holes 38h is formed in each of both ends of a part, in the flat wiring member 30, to which the shape maintaining member 40 is attached. The pair of fixing holes 38h is formed in both lateral sides of a part, in the sheet member 38, where the plurality of insulated wires 32 are arranged.

The shape maintaining member 40 is a member provided in at least a part of the flat wiring member 30 to keep at least the part of the flat wiring member 30 in an uneven shape.

The shape maintaining member 40 is a member made up of a resin or a metal, for example, having stiffness to the extent of keeping a certain shape. The shape maintaining member 40 is formed into a shape corresponding to a shape of an uneven surface of an object-attached part 10 to which the wiring member 20 is attached. When the shape maintaining member 40 is made up of the resin, a foam resin or a non-foam resin may be adopted.

Herein, as an example, the object-attached part 10 has a shape that a rectangular parallelepiped part 14 having a height lower than a rectangular parallelepiped part 12 adjacent to one side surface of the rectangular parallelepiped part 12. Formed in this case is an uneven surface 11 including a convex portion, which is a ridge part made up of an upper surface and the one side surface of the rectangular parallelepiped part 12 and a concave portion, which is a valley part made up of the one side surface of the rectangular parallelepiped part 12 and the upper surface of the rectangular parallelepiped part 14, in an area from the upper surface of the rectangular parallelepiped part 12 to an upper surface of the rectangular parallelepiped part 14 via the one side surface of the rectangular parallelepiped part 12. The uneven surface 11 is also deemed to have a stepped shape, more specifically, a stepped shape that the upper surface of the rectangular parallelepiped part 12 and the upper surface of the rectangular parallelepiped part 14 connect with each other with a difference in height. The wiring member 20 is arranged along the uneven surface 11, that is to say, along from the upper surface of the rectangular parallelepiped part 12 to the upper surface of the rectangular parallelepiped part 14 via an upper side of the one side surface of the rectangular parallelepiped part 12.

The shape maintaining member 40 is formed into a shape corresponding to the shape of the uneven surface 11 described above. More specifically, the shape maintaining member 40 includes a middle part 42, one end 43, and the other end 44.

The middle part 42 is formed into a plate-like shape, that is, a rectangular plate-like shape herein. A width size of the middle part 42 is set to the same as or larger than that of the flat wiring member 30 described above. A length size of the middle part 42 is set to correspond to a size of the difference in height between the upper surface of the rectangular parallelepiped part 12 and the upper surface of the rectangular parallelepiped part 14.

Each of the one end 43 and the other end 44 are formed into a plate-like shape, that is, a rectangular plate-like shape herein. A width size of each of the ends 43 and 44 are set to the same as or larger than that of the flat wiring member 30 described above. A length size of each of the ends 43 and 44 is set to a size to the extent that at least a part of the flat wiring member 30 can be widen and arranged.

The one end 43 extends in a direction intersecting with the middle part 42 from one side edge (upper side edge) of the middle part 42 (a crossing direction corresponding to an angle between the upper surface and the side surface of the rectangular parallelepiped part 12, that is, an orthogonal direction herein). The other end 44 extends in a direction intersecting with the middle part 42 from the other side edge (lower side edge) of the middle part 42 (a crossing direction corresponding to an angle between the side surface the rectangular parallelepiped part 12 and the upper surface of the rectangular parallelepiped part 14, that is, an orthogonal direction herein). The one end 43 and the other end 44 extend in an opposite direction with respect to the middle part 42.

Thus, the shape maintaining member 40 has the uneven shape corresponding to the uneven surface 11 made up of the upper surface and the one side surface of the rectangular parallelepiped part 12 and the upper surface of the rectangular parallelepiped part 14, and the shape maintaining member 40 can be arranged as close as possible to the uneven surface 11.

The pairs of fixing protrusions 43p and 44p which can be inserted into the fixing holes 38h, respectively, protrude from a main surface (upper surface) of each of the ends 43 and 44. The pair of fixing protrusions 43p protrudes from both sides of the main surface (upper surface) of the end 43, and the pair of fixing protrusions 44p protrudes from both sides of the main surface (upper surface) of the end 44.

The shape maintaining member 40 described above is attached to the flat wiring member 30 in the following manner to keep at least the part of the flat wiring member 30 in the uneven shape.

That is to say, the pair of fixing protrusions 43p in the one end 43 is inserted into the pair of fixing holes 38h formed in the sheet member 38 of the flat wiring member 30 (refer to FIG. 2). The pair of fixing protrusions 44p in the other end 44 is inserted into the other pair of fixing holes 38h formed in the flat wiring member 30 (refer to FIG. 2). Accordingly, the flat wiring member 30 is positioned with respect to the shape maintaining member 40. A part of the flat wiring member 30 between the two pairs of fixing protrusions 44p is arranged along the ends 43 and 44 and the main surface of the middle part 42. Accordingly, the middle part of the flat wiring member 30 in the extension direction is kept in the uneven shape corresponding to the shape of the shape maintaining member 40.

The fixing protrusions 43p and 44p described above may be prevented from falling off the fixing holes 38h with the fixing protrusions 43p and 44p inserted into the fixing holes 38h. Adoptable as a configuration for such a purpose is a configuration of melting and crushing flatly tip portions of the fixing protrusions 43p and 44p by heat, for example. It is also applicable to provide a protrusion or attach a retaining piece (called an E type retaining ring, for example) for preventing the fixing protrusions 43p and 44p from falling off on the tip portions of the fixing protrusions 43p and 44p.

The configuration for attaching the shape maintaining member 40 to the flat wiring member 30 is not limited to the example described above. It is applicable to attach the shape maintaining member 40 to the flat wiring member 30 by winding a banding member such as an adhesive tape or a banding band around the shape maintaining member 40 and the flat wiring member 30, the flat wiring member 30 being arranged along the shape maintaining member 40. The shape maintaining member 40 and the flat wiring member 30 may be joined by welding (the ultrasonic welding or thermal welding), fusion, an adhesive agent, or a double-sided tape, for example.

Figure 5:
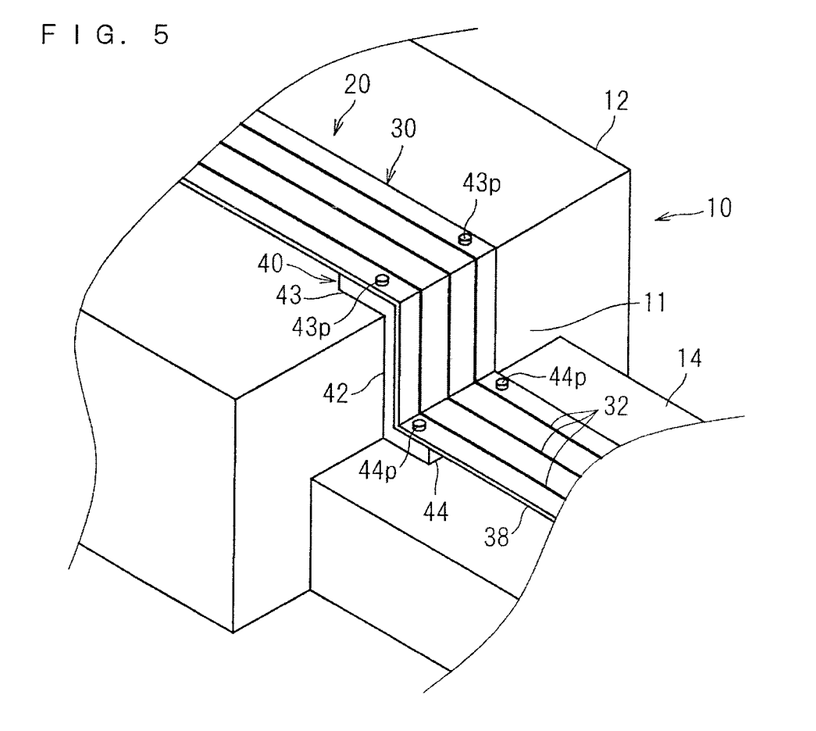
FIG. 5 A schematic perspective view illustrating the wiring member arranged along an object-attached part.

When the wiring member 20 is arranged along the object-attached part 10, as illustrated in FIG. 5, the part of the flat wiring member 30 formed into a predetermined uneven shape by the shape maintaining member 40 is arranged along the uneven surface 11 of the object-attached part 10. Specifically, the one end 43 is arranged along the upper surface of the rectangular parallelepiped part 12, the other end 44 is arranged along the upper surface of the rectangular parallelepiped part 14, and the middle part 42 is arranged along the one side surface of the rectangular parallelepiped part 12. The part of the flat wiring member 30 extending from the one end 43 is arranged along the upper surface of the rectangular parallelepiped part 12, and the part of the flat wiring member 30 extending from the other end 44 is arranged along the upper surface of the rectangular parallelepiped part 14.

The wiring member 20 is fixed to the object-attached part 10 in an appropriate position as necessary by a vehicle fixing component such as a clamp component. At this time, the shape maintaining member 40 may be fixed to the object-attached part 10 by a vehicle fixing component such as a clamp component. A part for fixing the shape maintaining member 40 to the vehicle may be integrally formed with the shape maintaining member 40. However, when front and back sides of the shape maintaining member 40 in the wiring member 20 are fixed to the object-attached part 10 by the vehicle fixing component, for example, the shape maintaining member 40 needs not be fixed to the object-attached part 10.

Figure 6:
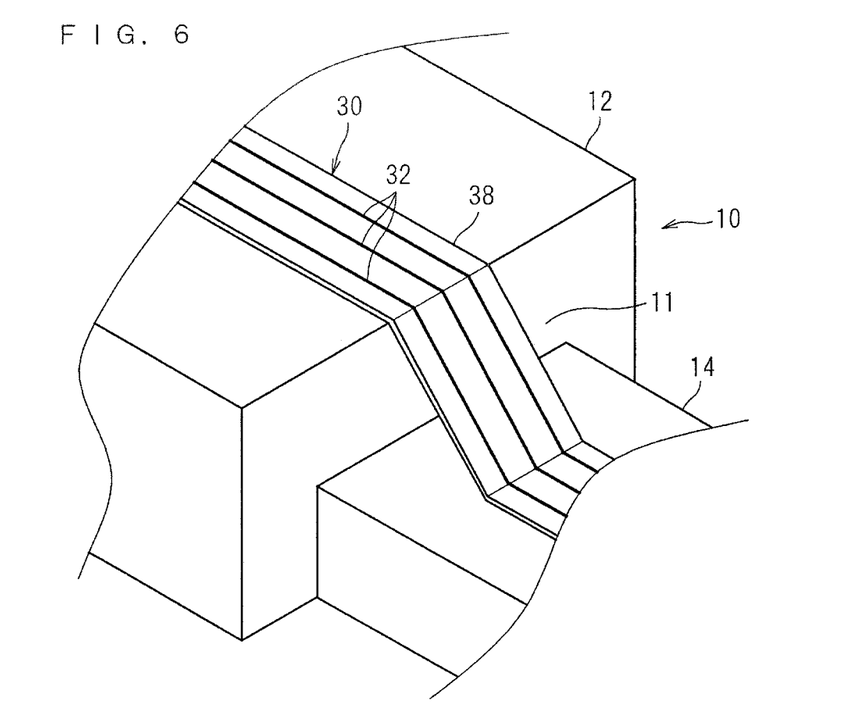
FIG. 6 A schematic perspective view illustrating a wiring member according to a comparison example arranged along an object-attached part.

FIG. 6 is a drawing illustrating the flat wiring member 30, in which the shape maintaining member 40 is omitted, arranged on the object-attached part 10 as a comparison example. Assumed in this case is that it is difficult to arrange the flat wiring member 30 on a back of a concave portion between the one side surface of the rectangular parallelepiped part 12 and the upper surface of the rectangular parallelepiped part 14, so that the flat wiring member 30 is arranged in an oblique posture from the upper surface of the rectangular parallelepiped part 12 to the upper surface the rectangular parallelepiped part 14. Then, a part of an upper space of the rectangular parallelepiped part 12 closer to the rectangular parallelepiped part 14 is occupied by the flat wiring member 30. Since the other component, for example, cannot be arranged in this space, so that this space is found to be a dead space.

In contrast, when the flat wiring member 30 is provided with the uneven shape corresponding to the uneven surface 11 by the shape maintaining member 40 as described above, the flat wiring member 30 can be arranged as close as possible to the uneven surface 11, thus the occurrence of the dead space described above can be reduced.

According to the wiring member 20 having the configuration described above, the uneven shape corresponding to the shape of the uneven surface 11 of the object-attached part 10 can be kept in the flat wiring member 30 by the shape maintaining member 40. Thus, the wiring member 20 can be arranged as close as possible to the uneven surface 11 of the object-attached part 10 at the time of arranging the wiring member 20 on the uneven surface 11. Thus, the occurrence of the dead space on the uneven surface 11 can be reduced, and the space can be efficiently used.

The fixing protrusions 43*p* and 44*p* provided on the shape maintaining member 40 are inserted into the fixing holes 38*h* formed in the sheet member 38 of the flat wiring member 30, thus the shape maintaining member 40 is attached to the flat wiring member 30. Thus, the shape maintaining member 40 can be easily attached to a certain position on the flat wiring member 30.

The flat wiring member 30 includes the sheet member 38 as the base member 38, and the plurality of insulated wires 32 are arranged on one main surface of the sheet member 38. Thus, the plurality of insulated wires 32 kept in the flat state by the sheet member 38 can be arranged as close as possible to the uneven surface 11 of the object-attached part 10.

The shape maintaining member 40 is provided on the same side as the side on which the sheet member 38 is provided for the plurality of insulated wires 32. The sheet member 38 is arranged on the side of the object-attached part 10 for the plurality of insulated wires 32 so as to protect the insulated wire 32 from the uneven surface 11 of the object-attached part 10. The shape maintaining member 40 can protect the insulated wire 32 from the uneven surface 11 of the object-attached part 10 together with the sheet member 38.

The shape maintaining member 40 is provided on an outer surface side of the sheet member 38, thus the plurality of insulated wires 32 kept in the flat state by the sheet member 38 can be kept in a predetermined uneven shape by the shape maintaining member 40 from the outer surface side of the sheet member 38. That is to say, in the part of the wiring member 20 kept in the uneven shape by the shape maintaining member 40, the plurality of insulated wires 32 can be kept along a predetermined route by the sheet member 38.

The shape maintaining member 40 may be provided on the part where the sheet member 38 is evenly provided in the extension direction of the insulated wire 32 as the wiring member 20, thus there is less need to perform specific processing on the flat wiring member 30, and the manufacture can be easily performed.

Second Embodiment

Figure 7:
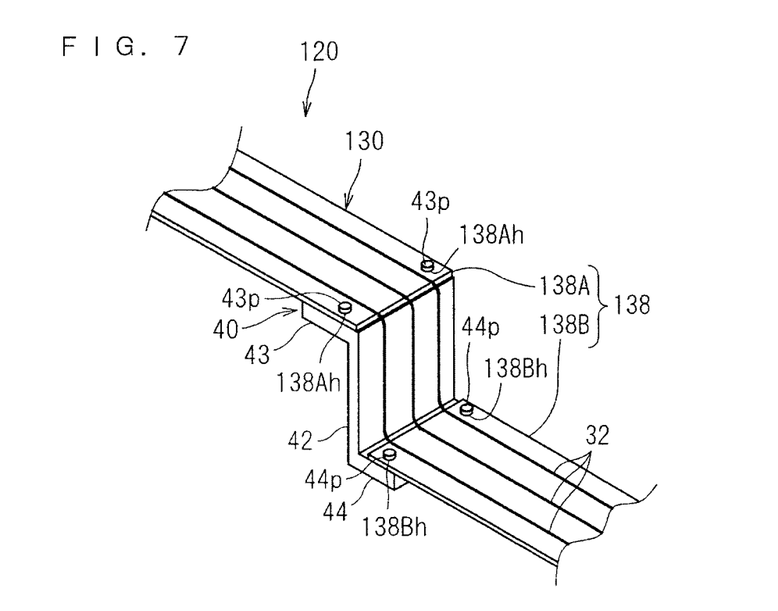
FIG. 7 A schematic perspective view of a wiring member according to a second embodiment.
Figure 8:
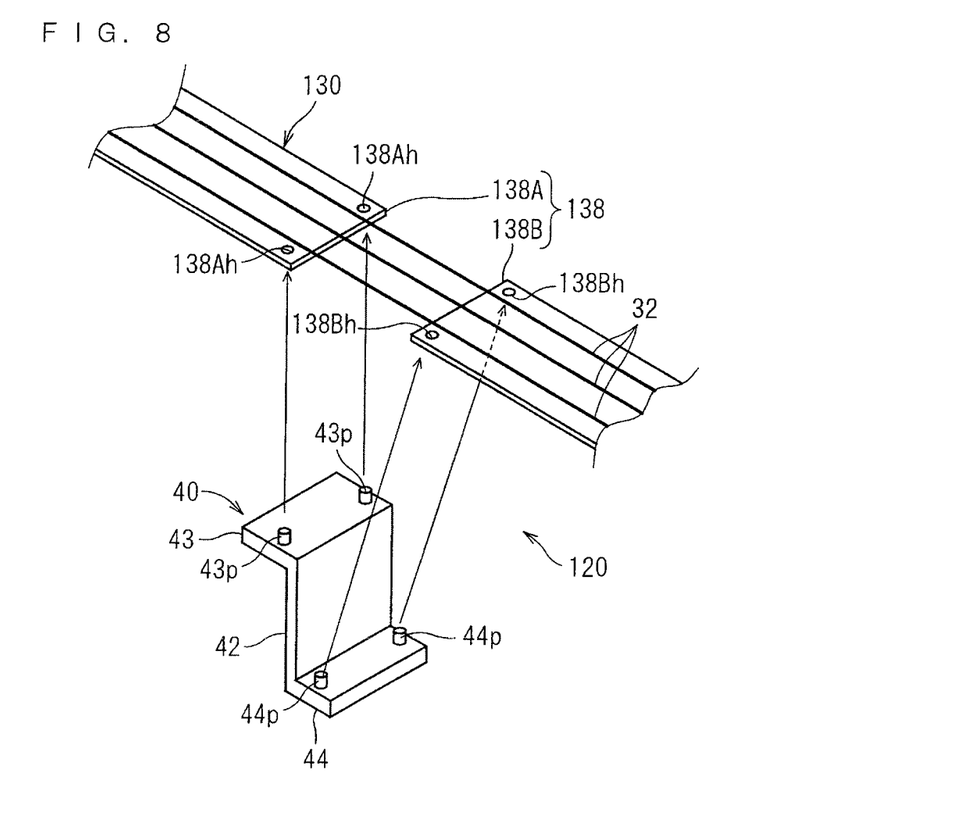
FIG. 8 A schematic exploded perspective view illustrating the wiring member in FIG. 7.

A wiring member 120 according to a second embodiment is described. FIG. 7 is a schematic perspective view illustrating the wiring member 120, and FIG. 8 is a schematic exploded perspective view illustrating the wiring member 120. In the following description of the present embodiment, the same reference numerals are assigned to the similar constituent elements described in the first embodiment, and the description thereof will be omitted.

The wiring member 120 includes a flat wiring member 130 and a shape maintaining member 40.

The flat wiring member 130 includes the plurality of insulated wires 32 and a sheet member 138.

The sheet member 138 is similar to the sheet member 38 described above in that the plurality of insulated wires 32 are kept in the flat state. A configuration according to the second embodiment is similar to that of the first embodiment in that the plurality of insulated wires 32 are arranged on one main surface of the sheet member 138.

The sheet member 138 is different from the sheet member 38 describe above in that the sheet 138 is made up of a first sheet member 138A and a second sheet member 138B separated from each other. A sheet member having the configuration similar to the sheet member 38 described above can be used as the first sheet member 138A and the second sheet member 138B.

The first sheet member 138A holds part of the plurality of insulated wires 32 in the extension direction in the flat state. The second sheet member 138B holds the other part of the plurality of insulated wires 32 in the extension direction in the flat state in a position separated from the first sheet member 138A in the extension direction of the plurality of insulated wires 32. A pair of fixing holes 138A*h* similar to the fixing holes 38*h* described above is formed on both sides of an end of the first sheet member 138A, and a pair of fixing holes 138B*h* similar to the fixing holes 38*h* are formed also on both sides of an end of the second sheet member 138B.

A length of the plurality of insulated wires 32 between the first sheet member 138A and the second sheet member 138B can be equal to or larger than the length size of the middle part 42 of the shape maintaining member 40. The configuration similar to that described in the embodiment described above can be applied to a configuration that the first sheet member 138A and the second sheet member 138B hold the plurality of insulated wires 32 in the flat state.

A middle part of the plurality of insulated wires 32 in the extension direction extends between the first sheet member 138A and the second sheet member 138B. The plurality of insulated wires 32 can be freely bent between the first sheet member 138A and the second sheet member 138B. A distance from the first sheet member 138A to the second sheet member 138B is approximately the same as a length of the plurality of insulated wires 32 therebetween, thus the plurality of insulated wires 32 are kept in parallel as they are held by the first sheet member 138A and the second sheet member 138B.

The configuration similar to that described in the first embodiment can be adopted as the configuration of the shape maintaining member 40.

The shape maintaining member 40 is attached to the flat wiring member 130 in the following manner to keep at least the part of the flat wiring member 30 in the uneven shape.

That is to say, the pair of fixing protrusions 43*p* in one end 43 is inserted into the pair of fixing holes 138A*h* formed in the end of the first sheet member 138A (refer to FIG. 8). The pair of fixing protrusions 44*p* in the other end 44 is inserted into the pair of fixing holes 138B*h* formed in the end of the second sheet member 138B (refer to FIG. 8). Accordingly, the flat wiring member 130 is positioned with respect to the shape maintaining member 40. The part of the plurality of insulated wires 32 of the flat wiring member 130 between the first sheet member 138A and the second sheet member 138B is arranged along the main surface of the middle part 42 between the both ends 43 and 44. Accordingly, the middle part of the flat wiring member 130 in the extension direction (particularly, the part of the plurality of insulated wires 32 between the first sheet member 138A and the second sheet member 138B) is kept in the uneven shape corresponding to the shape of the shape maintaining member 40.

The fixing protrusions 43p and 44p described above may have the configuration of preventing the fixing protrusions 43p and 44p from falling off the fixing holes 138Ah and 138Bh as described in the above first embodiment.

The configuration of attaching the shape maintaining member 40 to the flat wiring member 130 is not limited to the example described above, but the configuration using a banding member, welding (the ultrasonic welding or thermal welding), fusion, an adhesive agent, or a double-sided tape, for example, may also be applied as described in the above first embodiment.

Also according to the wiring member 120 in the second embodiment, the uneven shape corresponding to the shape of the uneven surface 11 of the object-attached part 10 can be kept in the flat wiring member 130 by the shape maintaining member 40. Thus, the wiring member 120 can be arranged as close as possible to the uneven surface 11 of the object-attached part 10 at the time of arranging the wiring member 120 on the uneven surface 11. Thus, the occurrence of the dead space on the uneven surface 11 can be reduced, and the space can be efficiently used.

The function effect similar to that in the first embodiment described above can be obtained except for the function effect obtained by providing the shape maintaining member 40 on the outer surface of the sheet member 38.

A used amount of the sheet member can be reduced between the first sheet member 138A and the second sheet member 138B. The plurality of insulated wires 32 can be protected from the uneven surface 11 of the object-attached part 10 by the shape maintaining member 40 between the first sheet member 138A and the second sheet member 138B.

Modification Example

The example that the wire-like transmission member is the insulated wire is described in each embodiment and each modification described above, however, the configuration of the wire-like transmission member is not limited thereto. The wire-like transmission member may be a wire-like member transmitting electricity or light, for example. For example, the wire-like transmission member may be a general wire having a core wire and a covering around the cores wire, or may also be a bare lead wire, a shielded wire, an enamel wire, a nichrome wire, or an optical fiber, for example.

The wire-like transmission member transmitting the electricity may be various kinds of signal lines or various kinds of power lines.

In the first embodiment, the flat wiring member may be a flexible flat cable (FFC) made up of parallelly-arranged wire-like conductors (wire-like transmission member) covering by an insulating covering (base member) such as a film, a flexible print circuit substrate (FPC) in which a print circuit (wire-like transmission member) is formed in an insulating member (base member) such as a resin film, for example, or a flat cable in which insulated wires are parallelly joined (a core wire in the insulated wire is the wire-like transmission member and a parallelly-joined insulating covering is a base member), for example.

Each configuration described in the embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 20, 120 wiring member
30, 130 flat wiring member
32 insulated wire (wire-like transmission member)
38, 138 sheet member (base member)
38h, 138Ah, 138Bh fixing hole
40 shape maintaining member
42 middle part
43, 44 end
43p 44p fixing protrusion
138A first sheet member
138B second sheet member

The invention claimed is:
1. A wiring member, comprising:
a flat wiring member including a plurality of wire-like transmission members and a base member keeping the plurality of wire-like transmission members in a flat state; and
a shape maintaining member provided in at least a part of the flat wiring member to keep at least the part of the flat wiring member in an uneven shape, wherein
the shape maintaining member includes a middle plate, a first end plate, and a second end plate,
the first end plate protrudes from a first surface of the middle plate, and the second end plate protrudes from a second surface of the middle plate that is opposite to the first surface,
the first end plate and the second end plate are disposed to protrude from the middle plate at different levels of the middle plate,
at least one fixing hole is formed in the base member,
at least one fixing protrusion that is insertable into the at least one fixing hole is formed on at least one of the first and second end plates of the shape maintaining member, and
the flat wiring member is positioned with respect to the shape maintaining member with the at least one fixing protrusion being inserted into the at least one fixing hole and with the flat wiring member being abutted against each of the middle plate, the first end plate, and the second end plate.
2. The wiring member according to claim 1, wherein the flat wiring member includes a sheet member as the base member, and the plurality of wire-like transmission members are arranged on one main surface of the sheet member.
3. The wiring member according to claim 2, wherein the shape maintaining member is provided on the plurality of wire-like transmission members on a side identical with a side on which the sheet member is provided.
4. The wiring member according to claim 2, wherein the shape maintaining member is provided on an outer surface side of the sheet member.

5. A wiring member comprising:
a flat wiring member including a plurality of wire-like transmission members and a base member keeping the plurality of wire-like transmission members in a flat state; and
a shape maintaining member provided in at least a part of the flat wiring member to keep at least the part of the flat wiring member in an uneven shape, wherein
the flat wiring member includes a sheet member as the base member, and the plurality of wire-like transmission members are arranged on one main surface of the sheet member,
the sheet member includes a first sheet member holding a part of the plurality of wire-like transmission members in an extension direction in a flat state and a second sheet member holding another part of the plurality of wire-like transmission members in an extension direction in a flat state in a position separated from the first sheet member, and
the shape maintaining member is provided between the first sheet member and the second sheet member.

* * * * *